3,462,488
AMINO OXIMINO POLYHALOCYCLOALKENES
AND PROCESS
Earl T. McBee, 420 Forest Hills Drive, West Lafayette,
Ind. 47906, and John J. Turner, 2219 Brookline Road,
Wilmington, Del. 19803
No Drawing. Filed Nov. 3, 1966, Ser. No. 591,672
Int. Cl. C07c *119/00, 87/34;* A01n *9/20*
U.S. Cl. 260—566
8 Claims

ABSTRACT OF THE DISCLOSURE

1 - methylamino-2-chloro or fluoro-3-methyliminotetrafluorocyclopentene is reacted with alcoholic hydroxylamine to produce 1-methylamine - 2 - chloro or fluoro-3-oximino tetrafluorocyclopentene or its tautomer with utility as a chelating agent for metals such as nickel.

---

This invention is directed to a new composition of matter and to a process of preparation thereof. More specifically, the present invention is concerned with novel methylamino oximino polyhalocyclopentenes which are prepared from the reaction of a imino-amines with hydroxylamine.

In accordance with the present invention there are provided the novel compounds described as methylamino oximino polyhalocyclopentenes and tautomers selected from the group consisting of the compounds as represented by the following structure:

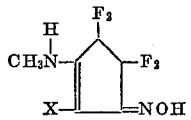

wherein X is a halogen atom selected from the group consisting of chlorine and fluorine. Illustrative examples of the novel compounds of the present invention include:

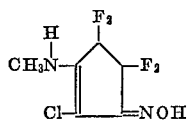

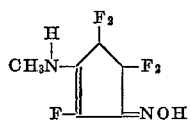

Also included within the scope of the present invention are the tautomers of the compounds of the present invention which are represented by the structure:

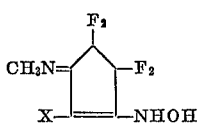

wherein X is a halogen atom selected from the group consisting of chlorine and fluorine.

The compounds of the present invention are prepared by reacting the corresponding imino-amines as represented by the formula:

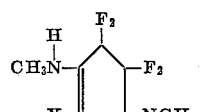

with an alcoholic solution of hydroxylamine, preferably in situ, wherein the substituent X is a halogen atom selected from the group consisting of chlorine and fluorine.

The imino amines that may be utilized in preparing the novel compounds of the present invention are the following:

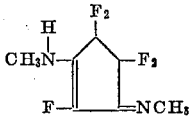 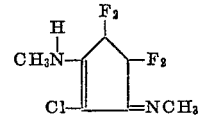

The reaction was accomplished in the presence of an anhydrous alcoholic solution of hydroxylamine, preferably prepared in situ, by combining a saturated solution of an alkali metal alkoxide with an excess of hydroxylamine hydrochloride, followed by filtration to remove the alkali metal chloride formed. Examples of alkali metal alkoxides which may be employed include, for example, sodium methoxide, sodium ethoxide, potassium methoxide, potassium ethoxide, and the like, with sodium methoxide being preferred, while examples of alcohols that are employed include those alcohols having from 1 to about 6 carbon atoms, such as methanol, ethanol, propanol, butanol, hexanol, and their various isomer forms. The preferred alcohol is methanol.

Generally the hydroxylamine solution is prepared by the addition of a solution of alkali metal alkoxide in alcohol, to a solution of hydroxylamine hydrochloride in alcohol, followed by separation of the alkali metal chloride formed, and recovery of a solution of hydroxylamine in alcohol. The first solution is comprised of an excess of alcohol, namely about from 5 to about 25 moles of alcohol, to about 1 mole of alkali metal alkoxide, and preferably 10 to 20 moles of alcohol to 1 mole of alkali metal alkoxide. Also effective are about 5 to about 25 moles of alcohol to about 2 or more moles of alkali metal alkoxide. Lesser and greater amounts can be used, as long as they do not adversely affect the reaction mechanism.

With respect to the second solution it is comprised of about 10 to 30 moles of alcohol, and preferably 12 to 20 moles of alcohol and 1 mole of hydroxylamine hydrochloride. Also there can be used about 10 moles to about 30 moles of alcohol to about 2 or more moles of hydroxylamine hydrochloride. It is appreciated that lesser and greater amounts may be used without detracting from the scope of the invention. Generally the use of an excess of the hydrochloride is desirable in order to avoid undesirable side reactions. The two solutions are mixed together and reacted at low temperatures ranging from 0 to 50 degrees, centigrade and preferably from 0 to 30 degrees centigrade thereby resulting in an alcoholic solution of hydroxylamine containing from about 15 to about 30 moles and preferably 20 to 25 moles of alcohol to 1 mole of hydroxylamine. Also effective are from about 15 to about 30 moles of alcohol to 2 or more moles of hydroxylamine. When the reaction is accomplished under mild conditions as illustrated in some examples, the hydroxylamine solution is normally comprised of from about 1 to about 10 moles of alcohol, to about 1 mole of hydroxylamine. Greater and lesser amounts are also permissible.

The temperature of the reaction can vary over wide ranges, but generally is from about 0 to about 75 degrees centigrade, and preferably from about 30 to about 65 degree centigrade. It is, of course, appreciated that lower and higher temperatures may be utilized, provided that such temperatures do not adversely affect the reaction mechanism. The reaction temperature generally depends upon the temperature at which the alcohol used in making the hydroxylamine refluxes at.

With regard to the amount of reactants employed, such amounts may be varied and depend on the reaction conditions. Normally the hydroxylamine is employed in substantial excess, from about 5 to about 400 percent excess, and preferably about 10 to 100 percent excess, of the amount of cycloolefine reactant used. In a more preferred embodiment 3 to 2 moles per mole of cycloolefine are used. It is appreciated that other ratios of reactants can be utilized, providing they do not adversely affect the reaction mechanism.

The desired product can be separated from the reaction mixture by a number of known methods such as extraction, solution chromatography, and the like.

The compounds of the present invention are useful as intermediates in the preparation of insecticides and also are useful as chelating agents for metal ions such as nickel, iron and others. It is believed that a mono-dentate non-chelated metal complex is formed when compounds of the present invention are reacted with a metal such as nickel. A typical complex structure is represented as follows:

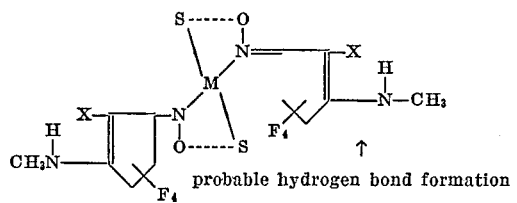

probable hydrogen bond formation wherein M is metal such as iron or nickel, X is a halogen selected from the group consisting of chlorine and fluorine, and S is a solvent molecule. The metal coordination occurs through the nitrogen atoms of the molecule thereby forming a stable chelate ring.

The chelate compounds are prepared by the mixing of stoichiometric amounts of an inorganic metal salt such as sodium chloride, sodium carbonate, with the compound of the present invention in a hot alcohol-water, or alcohol solution which solution is at a temperature in excess of 40 degrees centigrate and preferably from 45 to 75 degrees centigrade, at a pH of 6 to 8. The resulting solution is cooled to below room temperature of about 25 degrees centigrade, and preferably to about 10 degrees centigrade in an ice bath thereby precipitating the metal complex. subsequently the metal complex can be recovered by known techniques such as filtration.

The metal chelate compounds of the present invention are useful in water purification, as sequestering agents and academic study for investigating ligand bonding and ligand type reactions. The compounds are specifically useful in supplying valuable metal ions to the soil. Thus a metal chelate such as the nickel oxime of the present invention can be applied to the soil in amounts ranging from 5 to 25 pounds per acre and preferably 10 to 15 pounds per acre thereby providing to the soil a source of nickel. By adding the chelate of nickel to the soil a controlled release of nickel ions is provided thereby rendering such soil more fertile and allowing it to support growth of desirable vegetation more easily.

The following examples are presented to further illustrate the invention but are not intended to limit its scope. Unless specified otherwise, all temperatures are in degrees centigrade and all parts are by weight.

EXAMPLE 1

Preparation of hydroxylamine

In some of the following examples hydroxylamine solutions used were prepared by slowly adding a solution of sodium methoxide 59.4 grams (1.1 mole) in 350 milliliters of methanol at 0 degree centigrade to a solution of hydroxylamine hydrochloride 83.4 grams (1.2 mole) in 470 milliliters of methanol with ice cooling in order to keep the temperature below 30 degrees centigrade. After allowing the solution to stand for 5 minutes to allow the precipitation of sodium chloride, filtration gave a colorless solution of hydroxylamine 36.3 grams (1.1 mole) in 820 milliliters of methanol.

EXAMPLE 2

A solution of 2.6 grams (.012 mole) of 1-methylamino-3-methyliminopentafluorocyclopentene and 1.65 grams (0.50 mole) of hydroxylamine in 50 milliliters of methanol was refluxed at about 65 degrees centigrade with stirring for 4 days. The solution was evaporated and the residue extracted with ten 100 milliliter portions of ether. The ether solution was evaporated to 15 milliliters and chromatographed on an acid washed alumina column. Elution with 50 percent hexane-50 percent ether resulted in a crude product which was vacuum sublimed at 60 degrees centigrade under a pressure of .2 millimeter of mercury and resulted in colorless crystals of 1-hydroxylamino-3-methyliminopentafluorocyclopentene 1.4 grams, 54 percent yield with a melting point at 108–108.5 degrees centigrade.

Analysis.—Calculated (percent) for $C_6H_5N_2F_5O$: C, 33.33; H, 2.31; N, 12.96; F, 43.98. Found: C. 33.76; H, 2.43; N, 12.94; F, 44.13.

Molecular Weight.—Calculated: 216. Found: 212 (vapor pressure osmometry in chloroform).

The proton and fluorine nuclear magnetic resonance spectra indicated that some of the tautomer, 1-methylamino-3-ox iminopentafluorocyclopentene was also formed.

EXAMPLE 3

In a manner similar to Example 2, a solution of 10.8 grams, (.050 mole) of 1-methylamino-3-methyliminopentafluorocyclopentene, and 36.3 grams (1.1 mole) of hydroxylamine in 820 milliliters of methanol were refluxed for 7 days at a temperature of about 65 degrees centigrade. A product, 6.6 grams, 62 percent yield of colorless crystals of 1-hydroxylamino-3-methyliminopentafluorocyclopentene was recovered using elution chromatography. The product had a melting point of 95–107 degrees centigrade.

Analysis.—Calculated (percent) for $C_6H_5N_2F_5O$: C, 33.33; H, 2.31; N, 12.96; F, 43.98. Found: C, 33.76; H, 2.43; N, 12.94; F, 44.13 percent.

Molecular weight.—Calculated: 216. Found: 212 (vapor pressure osmometry in chloroform).

EXAMPLE 4

Following the procedure of Example 2, a solution of 2 grams (.0083 mole) of 1-methylamino-2-chloro-3-methyliminotetrafluorocyclopentene and 1.65 grams (.050 mole) of hydroxylamine in 50 milliliters of methanol, were refluxed for 4 days at a temperature of about 65 degrees centigrade. A product, 1 gram, 50 percent yield of colorless crystals of 1-hydroxylamino-2-chloro-3-methyliminotetrafluorocyclopentene was recovered by elution chromatography. The product had a melting point of 147–149 degrees centigrade.

Analysis.—Calculated (percent) for $C_6H_5N_2F_4ClO$: C, 30.97; H, 2.15; N, 12.04; F, 32.69. Found: C, 31.76; H, 1.98; N, 12.13; F, 33.40.

Molecular weight.—Calculated: 232.5. Found: 237 (vapor pressure osmometry in chloroform).

The proton and fluorine nuclear magnetic resonance spectra indicated that some of the tautomer 1-methylamino-2-chloro-3-hydroxyliminotetrafluorocyclopentene was also formed.

EXAMPLE 5

Following the procedure of Example 4 a solution of 11.5 grams (0.050 mole) of 1-methylamino-2-chloro-3-methyliminotetrafluorocyclopentene and 36.3 grams (1.1 mole) of hydroxylamine in 820 milliliters of methanol were refluxed for seven days at about 65 degrees centigrade resulting in the product 1 - hydroxylamino-2-chloro-3-methyliminotetrafluorocyclopentene having a melting point of 140–148° C. The product analyzed the same as the product of Example 4.

While there have been described various embodiments of the invention, the compositions and methods described are not intended to be understood as limiting the scope of the invention as it is realized that changes therewithin are possible, and it is further intended that each element recited in any of the following claims is intended to be understood as referring to all equivalent elements for accomplishing subtsantially the same results in substantially the same or equivalent manner, it being intended to cover the invention broadly in whatever form its principles may be utilized.

What is claimed is:

1. An amino oximino polyhalocycloalkene of the formula

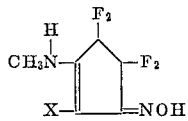

wherein X is a halogen atom selected from the group consisting of chlorine and fluorine.

2. The compound of claim 1 wherein X is fluorine.
3. The compound of claim 1 wherein X is chlorine.
4. A process for the preparation of an amino oximino polyhalocycloalkene of the formula

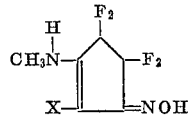

which comprises reacting a compound of the formula

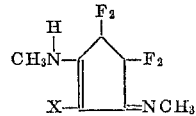

with a lower alcoholic solution of a stoichiometric excess of hydroxylamine, wherein X is a halogen atom selected from the consisting of chlorine and fluorine, at a temperature in the range of from about 0 to about 75 degrees centigrade.

5. A process in accordance with claim 9 wherein the reaction is accomplished at a temperature of from about zero degrees centigrade to about 65 degrees centigrade, the alcohol is methanol and the desired product is recovered.

6. A process in accordance with claim 5, wherein the hydroxylamine employed is prepared in situ by reacting a solution of sodium methoxide in an excess of methanol with a solution of hydroxylamine hydrochloride in an excess of methanol at a temperature in the range of zero to 50 degrees centigrade, thereby precipitating sodium chloride, and removing the sodium chloride.

7. A process in accordance with claim 5 wherein one of the reactants is 1-methylamino-2-fluoro-3-methyliminopentafluorocyclopentene and the product recovered is 1-hydroxylamino - 2 - fluoro-3-methyliminopentafluorocyclopentene.

8. A process in accordance with claim 5 wherein one of the reactants is 1-methylamino-2-chloro-3-methyliminotetrafluorocyclopentene, and the product recovered is 1-hydroxylamino - 2-chloro-3-methyliminotetrafluorocyclopentene.

References Cited

Hauser, "J. Am. Chem. Soc." vol. 77, pp. 4885–6 (1955).
Parker, "J. Am. Chem. Soc." vol. 81, pp. 2183–8 (1959).
Raphael, "Adv. In. Org. Chem." vol. 3, pp. 261–2 (1963).

LEON ZITVER, Primary Examiner

MATTHEW M. JACOB, Assistant Examiner

U.S. Cl. X.R.

71—97; 210—42; 260—439

PO-1050
(5/69)

UNITED STATES PATENT OFFICE
CERTIFICATE OF CORRECTION

Patent No. 3,462,488                Dated   August 19, 1969

Inventor(s)  -   Earl T. McBee et al.

It is certified that error appears in the above-identified patent and that said Letters Patent are hereby corrected as shown below:

Column 3, line 2, "3 to 2 moles" should read -- 3 to 20 moles --; column 3, line 20, the formula should appear as follows:

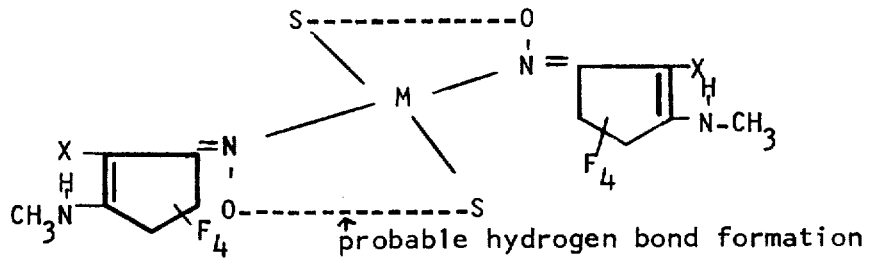

Column 4, line 4, "(0.50 mole)" should read -- (.050 mole) --;

Column 5, line 7, "subtsantially" should read -- substantially. Column 6, line 1, Claim 4, "from the consisting" should be -- from the group consisting --; column 6, line 4, Claim 5, "Claim 9" should be -- Claim 4

SIGNED AND
SEALED
AUG 25 1970

(SEAL)
Attest:

Edward M. Fletcher, Jr.
Attesting Officer

WILLIAM E. SCHUYLER, JR.
Commissioner of Patents